(12) United States Patent
Crowe

(10) Patent No.: US 9,471,953 B1
(45) Date of Patent: Oct. 18, 2016

(54) DIGITAL SPORTS TABLE

(71) Applicant: Gregory Leon Crowe, Tuscaloosa, AL (US)

(72) Inventor: Gregory Leon Crowe, Tuscaloosa, AL (US)

( * ) Notice: Subject to any disclaimer, the term of this patent is extended or adjusted under 35 U.S.C. 154(b) by 0 days.

(21) Appl. No.: 14/341,805

(22) Filed: Jul. 26, 2014

Related U.S. Application Data

(60) Provisional application No. 61/859,219, filed on Jul. 27, 2013.

(51) Int. Cl.
| | |
|---|---|
| *A47B 21/007* | (2006.01) |
| *G06T 1/20* | (2006.01) |
| *A63B 71/06* | (2006.01) |
| *A63B 71/00* | (2006.01) |
| *G06Q 30/02* | (2012.01) |
| *A47B 83/00* | (2006.01) |
| *G07F 17/32* | (2006.01) |

(52) U.S. Cl.
CPC ............... *G06T 1/20* (2013.01); *A47B 21/007* (2013.01); *A47B 83/001* (2013.01); *A63B 71/0054* (2013.01); *A63B 71/0669* (2013.01); *G06Q 30/0241* (2013.01); *G07F 17/322* (2013.01); *A63B 2071/0063* (2013.01); *A63B 2071/0694* (2013.01)

(58) Field of Classification Search
None
See application file for complete search history.

(56) References Cited

U.S. PATENT DOCUMENTS

| | | | | |
|---|---|---|---|---|
| 5,967,055 | A | * | 10/1999 | Schumacher ............... 108/50.11 |
| 8,378,620 | B2 | * | 2/2013 | Reckelhoff ................... 320/101 |
| 2006/0267952 | A1 | * | 11/2006 | Alcorn .......................... 345/173 |
| 2008/0104166 | A1 | * | 5/2008 | Alvarez ................. G06Q 10/06 709/203 |
| 2008/0183582 | A1 | * | 7/2008 | Major ............................ 705/14 |
| 2009/0005150 | A1 | * | 1/2009 | Haveson ......................... 463/20 |
| 2009/0045706 | A1 | * | 2/2009 | Levitt ................... A47B 21/00 312/223.3 |
| 2011/0122050 | A1 | * | 5/2011 | Mutlow ........................ 345/1.3 |
| 2012/0287226 | A1 | * | 11/2012 | Baloga et al. ............. 348/14.08 |
| 2012/0312199 | A1 | * | 12/2012 | Johnson et al. ........... 108/50.11 |

* cited by examiner

*Primary Examiner* — Joni Richer
(74) *Attorney, Agent, or Firm* — Karen B. Tripp

(57) ABSTRACT

A table with a digital display screen in communication with a computer tablet or cell phone for transfer of display digital content information to the screen via one or more HDMI cables. A method for using the table includes adapting the table to be used as a scorer's table and providing advertising and player and game information on the digital display screen.

7 Claims, 2 Drawing Sheets

US 9,471,953 B1

DIGITAL SPORTS TABLE

RELATED PATENT APPLICATION

This patent application claims priority from U.S. Provisional Patent Application No. 61/859,219, filed Jul. 27, 2013.

FIELD OF THE INVENTION

The present invention generally relates to video display technology, particularly as applied to a sports table or scorer's table for use in displaying advertising and game information at sporting events.

BACKGROUND OF THE INVENTION

The following paragraphs contain some discussion, which is illuminated by the innovations disclosed in this application, and any discussion of actual or proposed or possible approaches in this Background section does not imply that those approaches are prior art.

During an athletic event, such as a basketball game for example, a scorer's table is typically positioned adjacent or near the court. Scorekeepers typically sit at the table and keep track of the game clock and the score, which are typically displayed on nearby scoreboards typically hanging on the wall or from the ceiling of the facility housing the event. More recently, at least at professional sporting events, scorer's tables have digital displays located on the front of the table. Such displays may be LED arrays, allowing the scorers to display static images, graphic images, advertisements, and/or statistical game information.

The drawback of such LED scorer's tables is that they tend to be very expensive and thus available only for professional sports events and for some top tier college events. There is a need for a digital scorer's table that is more affordable and that can be easily mass produced so as to be available for lower market segments.

SUMMARY OF THE INVENTION

Some teachings and advantages found in the present application are summarized briefly below. However, note that the present application may disclose multiple embodiments, and not all of the statements in this Summary section necessarily relate to all of those embodiments. Moreover, none of these statements limit the claims in any way.

The present invention provides a table with one or more HDMI (High Definition Multi-Media Interface) cables for digital transfer of display digital content information, such as for example advertisements and sports and player information, from any source such as computers, tablet computers, cell phones and the like, to the digital display screen on the table. The digital transfers into the digital display screen may be effected via an amplified digital splitter that allows the table to run alone or in a series of tables displaying the same information. An adapter may be used for connecting a tablet computer or cell phone for example to an HDMI cable which is connected to the digital display screen.

The present invention further provides a method of using the table of the invention, wherein the display information includes advertisements and/or sports information and/or player information.

DESCRIPTION OF PREFERRED EMBODIMENTS

Figure 1:
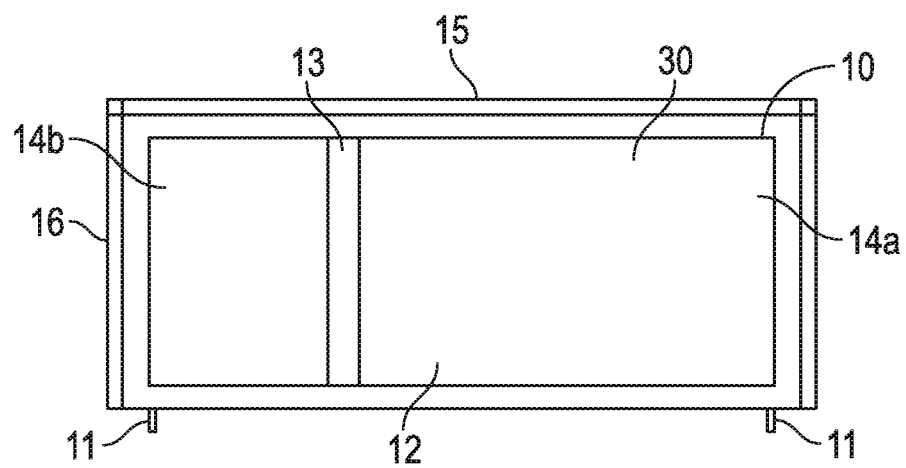
FIG. 1 is the front view of one embodiment of a table of the invention.
Figure 2:
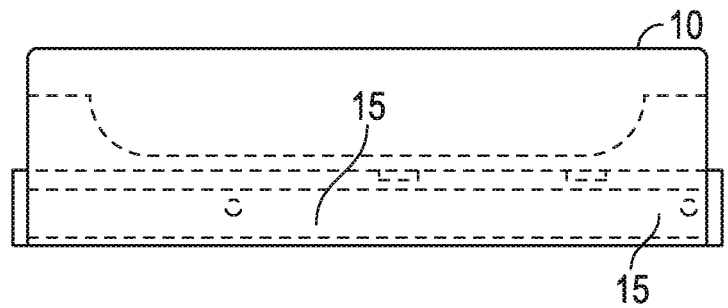
FIG. 2 is the top view of the table of FIG. 1.

Referring to FIGS. 1 and 2, a table 10 of one embodiment of the present invention is shown as suitable for use as a scorer's table at, for non-limiting example, a basketball or volleyball game or at a wrestling or tennis match. The table 10 might be useful at other sporting events or even nonsporting events as well. The table may be of any size, but will preferably be sufficiently long in this embodiment that at least one person may sit behind it. For example, the table shown in FIG. 1 is 6 feet long, 31 inches high, and 20.75 inches in depth. The table 10 preferably rests on a plurality (such as for example four) locking caster wheels 11. In one embodiment, the wheels are rubber coated.

Face 12 of the table 10 comprises two panels 14a and 14b. Panel 14a is preferably comprised of Plexiglas (or safety glass or similar clear material such as Lucite or clear acrylic, preferably resistant to breakage or shattering), about 48 inches wide by 28.75 inches high. Face 12 may be flat as shown, or may be slanted to enhance the ease of viewing the content on the panels. Panel 14b is comprised of ¾ inch plywood or aluminum (or similar wood or metal building materials, including for non-limiting example pressed fiber board, pressed wood or other engineered wood product, and iron or steel, and also plastic, etc.) that is in this example embodiment about 21 inches wide by 28.75 inches high. Other sizes may be used. Panel 14b may include a banner affixed thereto or a logo painted thereon or similar static advertising (not shown). Behind panel 14a is an LCD, LED or plasma digital display monitor 30. Panel 14a may be positioned on the right side of the table 10 or on the left side of table 10, and panel 14b is positioned on the alternate side of the table 10 from panel 14a. Panels 14a and 14b are preferably framed, most preferably by 1×2 inch strips 13 comprised of wood, metal, plastic or similar building material. Table 10 preferably has padding or strips of padding preferably placed all around or at least on the edges and corners to enhance safety for players playing near the table 10. In one embodiment, table 10 has a top pad 15 positioned at the top edge of table 10 about 4 inches wide and running the length of the table 10, in this embodiment about 6 feet. Side pads 16 run the height of table 10, in this embodiment about 33 inches. Pads 15 and 16 and any other padding are preferably removably attached to table 10 with key slotting or Velcro fasteners or the like. A service door (not shown) may be provided at the back of the table.

Figure 3:
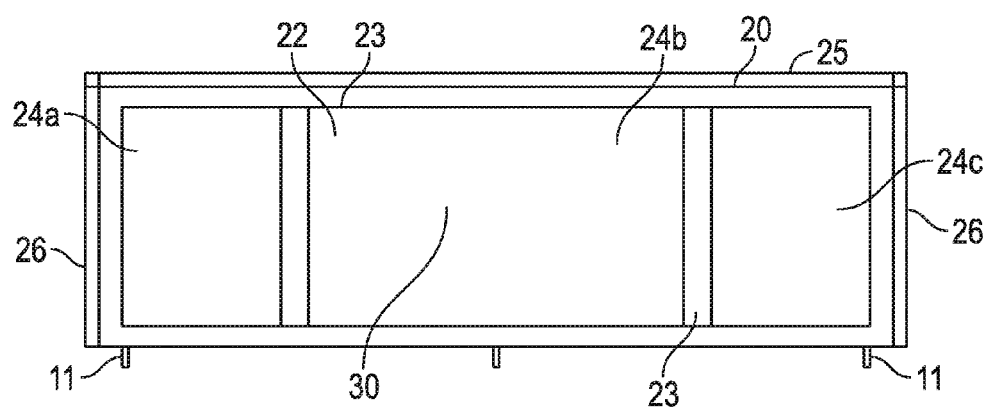
FIG. 3 is the front view of an alternative embodiment of a table of the invention.
Figure 4:
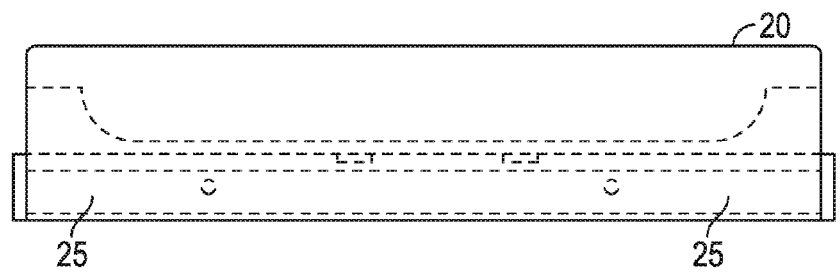
FIG. 4 is the top view of the table of FIG. 3.

Another embodiment of the table of the invention is depicted in FIGS. 3 and 4. Table 20 in FIGS. 3 and 4 is longer than table 10 in FIGS. 1 and 2, allowing for more display space. In one example embodiment, table 20 is about 8 feet long, 31 inches wide and 20.75 inches in depth. Table 20 preferably rests on four locking caster wheels 11.

Face 22 of table 20 has three panels 24a, 24b, and 24c. In one embodiment, panel 24b is positioned in the center or middle and is preferably comprised of Plexiglas (or safety glass or similar clear material, preferably resistant to breakage or shattering, such as Lucite or clear acrylic for non-limiting example). Panel 24b may be 48 inches wide by 28.75 inches wide in one embodiment, although other sizes that fit on face 22 would alternatively suffice. Panel 24a and panel 24c are positioned adjacent to panel 24b but on opposing sides so that panel 24b is in the middle as discussed above. Panels 24a and 24c may be comprised of plywood, wood, pressed fiber board, pressed wood or other engineered wood product, aluminum, steel, iron, plastic, or other similar building or construction material. Panels 24a and 24b are each about 21 inches wide by 28.75 inches wide in one embodiment. Behind panel 24b is an LCD, LED or plasma digital display monitor 30. A banner or painted logo or similar static advertising (not shown) may be placed on panels 24a and 24b. Panels 24a, 24b, and 24c are preferably framed, most preferably by 1×2 inch strips 23 comprised of wood, pressed wood, plywood, aluminum, steel, iron, or other similar building or construction material. Table 20 preferably has padding or strips of padding preferably placed all around or at least on the edges and corners to enhance safety for players playing near the table 20. In one embodiment, table 20 has a top pad 25 positioned at the top edge of table 20 about 4 inches wide and running the length of the table 20, in this embodiment about 8 feet. Side pads 26 run the height of table 20, in this embodiment about 33 inches. Pads 25 and 26 and any other padding are preferably removably attached to table 20 with key slotting or Velcro fasteners or the like.

In another embodiment of the table of the invention, the table is constructed into a square or cube shape (not shown). The cube table may or may not include any side panels for non-digital advertising. The cube model, however, comprises a digital display panel, preferably positioned within the frame of the cube. The frame may be comprised of wood, plywood, pressed wood or other engineered wood product, aluminum, steel, plastic, or other durable material commonly used for construction or building. Such a cube table may be positioned on the floor directly, may rest on legs or caster wheels, or may be hung from a wall.

The digital display monitor 30 may show animated graphics, images, and statistical game information. The table of the invention, such as table 10 and table 20 for example, has HDMI wiring for connecting audiovisual peripherals, an HDMI splitter, and adapters such as a 30 pin to an HDMI adapter. The table of the invention also includes a power strip to provide easy access to power for plugging in peripherals.

The digital display monitor 30 is controlled by a tablet computer such as an Apple iPad. Software on the tablet for example will allow scorers to present a scoreboard on the digital display 30. As a scoreboard, the digital display 30 will typically display a game clock and the score for each team or contestant playing in a game. Scorers can typically use controls on the tablet to start and stop the game clock and assign points to teams. Such virtual scoreboard function can be manipulated and customized depending on the specific sport being played for use of the invention with any sport.

The digital display monitor 30 can also be used to display statistical game information, including information for example about individual players. For example, the digital display monitor can be used to show biographical statistical information on each player in a starting line-up, with the information shown for an individual player when the player is announced. Such information might include the player's name, the player's image, and the player's height, the player's weight, the position the player plays, the player's team number, the player's scoring percentage, number of wins, or any other game relevant information.

The table can be used to create or otherwise provide advertising to be displayed on the digital display monitor 30 during a gaming event. Schools for example using the table of the invention may create and/or use advertising templates preloaded onto the computer tablet to create or provide custom advertisements for display. Schools may also create wholly original advertisement images or videos to display on the digital display monitor 30. The advertisements may be static images or motion video. The advertisements may be preloaded onto the tablet for convenience and may be presented in a predetermined order or randomly. The advertisements may continuously repeat or otherwise be periodic. That is, the advertisements may display for preset times prior to changing to other advertisements. Scorers or other officials or operators may control the display of advertisements in real time during the play of the game. The advertisements may be controlled so that the advertisements display in conjunction with other non-advertisement information, such as game score and game clock for example.

The table of the invention can be used for other purposes than during a live sporting event to display game and/or player information and/or advertisements. Coaches may use the table for training purposes for example. That is, the digital display monitor can be coordinated with a computer tablet to teach game plays, plan plays and analyze plays and statistics. A coach may even draw on the tablet with a finger to show locations of players on the court or field and how those players should move in a specific play, and have these drawings displayed on the digital display monitor of the table. The image of the play drawn by the coach is transferred to and displayed on the digital display monitor for multiple players to view simultaneously. Players advantageously do not have to leave the court to view a play drawn on a chalkboard or blackboard. Additionally, the digital display monitor of the table may be used to show video of one or more players during a game or a practice for a video replay or as a coaching tool. The video replay may show video of the game in real time or at another point during game play. Additionally, the video replay may be used by coaches to analyze plays during a game to instruct and educate players. Players may advantageously view a video while on the court, avoiding having to leave the field of play to receive instructions. Such instruction may thus be presented faster and easier with the favorable consequence that players will be more likely to retain and incorporate the information presented in their performance.

The table of the invention can be used alone or in multiples to create a long line of digital display monitors and banner ads. The digital display monitors of tables of the invention may be configured to display different images or to display identical images and videos. In one embodiment of the invention, the table of the invention may be hung on a wall and may optionally be configured to display different images or to display identical images and videos as another table of the invention hung on the wall or resting on wheels on the ground or floor. In another embodiment of the invention, the table of the invention does not include any space for non-digital advertisement and is designed to be a stand-alone item of furniture.

The present invention is also directed to a method of using the table of the invention. The method comprises the following steps, of which all steps or any combination of steps may comprise the method of the invention:

1. Creating, or allowing others to create, digital advertising material;
2. Storing, or allowing others to store, electronic files of the advertising material on a tablet computer;
3. Removably attaching or associating the tablet computer to or with a digital sports table;
    a. The digital sports table having a digital display screen located on the front of the table, said digital display screen placed behind Plexiglas or other clear material providing protection to the screen while also allowing the screen to be viewed;
b. The digital sports table at least optionally having an area for non-digital display located on the front of the table;
c. The digital sports table being built primarily out of wood or engineered wood product, or aluminum, steel or other metal, or plastic;
d. The digital sports table being outlined in strips of padding for safety;
e. The digital sports table optionally having caster wheels for holding the table above the floor for ease of movement.
4. Displaying the advertising material on the digital display of the digital sports table during a live sporting event;
5. Creating, or allowing others to create, biographical and/or statistical information of players or team members and storing such information in digital format on the tablet computer;
6. Displaying, or allowing others to display, the biographical and statistical information of players or team members on the digital display of the digital sports table during a live sporting event;
7. Allowing others to create diagrams on the tablet for use in sports instruction and education. Allowing others to display the diagrams on the digital display of the digital sports table for the purposes of educating and instructing athletic competitors.
8. Allowing others to connect audiovisual peripherals to the digital display of the digital sports table. Allowing others to download and store audiovisual files from audiovisual peripherals on the tablet computer. Allowing others to display audiovisual footage or files on the digital display table for the purpose of educating and instructing athletic competitors. Allowing others to display audiovisual footage or files on the digital display table for the purpose of educating and informing viewers in non-sports settings.

In another embodiment, the method of using the table of the invention comprises the following steps, of which all steps or any combination of steps may comprise the method of the invention:
1. Providing a digital sports table for use, wherein:
   a. The table has a digital display screen located on the front of the table and behind a protective covering such as Plexiglas that allows the screen to be viewed while providing protection for the screen;
   b. The table has an area for non-digital display located on the front of the table;
   c. The table is constructed primarily of wood or engineered wood product, aluminum, steel, other metal, or plastic;
   d. The table has padding for safety, particularly around the edges;
   e. The table rests on caster wheels, preferably lockable, for ease of movement.
2. Allowing use of the table during live sporting events for the purpose of displaying advertisements and/or biographical and/or statistical information to attendees of the event;
3. Contacting potential advertisers and/or otherwise soliciting potential advertisers to buy advertising space for display on the digital display screen of the table during live sporting events;
4. Selling advertising space for display on the digital display screen of the table;
5. Creating digital advertising material for display on the digital display screen of the table;
6. Obtaining digital advertising material created by others for display on the digital display screen of the table;
7. Storing electronic files containing digital advertising material on a tablet computer to be associated with the table;
8. Removably attaching the tablet computer to the table;
9. Displaying the advertisements on the display screen of the table during a live sporting event;
10. Providing a predetermined percentage of revenue generated from the sale of advertising space on the digital display screen during live sporting events to the user of the table;
11. Performing any step of this method wherein the user of the table is a school, such as a primary school, a middle school, an elementary school, a junior high school, a high school;
12. Performing any step of this method wherein the user of the table is an institute of higher education;
13. Performing any step of this method wherein the user of the table is a 501(c)(3) entity for educational purposes;
14. Performing any step of this method wherein the user of the table is a sports facility;
15. Performing any step of this method wherein the user of the table is a commercial space or venue.

It is anticipated that the table of the invention will primarily be used at sporting events or for sports related purposes and the invention has been primarily described herein in that context. However, the invention may be used for any of a number of additional purposes outside of sports. For example, the table of the invention may be used for exhibitions at tradeshows, conferences or other meetings. The table may alternatively be used for information displays in public areas or for corporate videoconferencing or corporate presentations. The cube model of the table may be particularly well suited for such alternative uses.

The invention has been described wherein the primary means of uploading and storing information to be displayed on the digital display of the table of the invention is through use of a tablet computer associated with the table or at least the digital display monitor of the table. However, other means might alternatively be used. That is, for example, information may be stored at a remote location and transferred to the table for display via a wireless network or internet connection. Cell phones might also be used as an alternative to a tablet computer.

The table of the invention may have various sizes, shapes, colors and embodiments. Two sizes were discussed and illustrated in detail—72 inches long by 31 inches high by 20.75 inches deep and 96 inches long by 31 inches high by 20.75 inches deep. However, as noted a cube (31 inches for example) is contemplated as well as any number of varying lengths and widths and depths depending on the desired location of use and the function for the table in use.

While preferred embodiments of the invention have been shown and described, modifications thereof and be made by one skilled in the art without departing from the spirit and teachings of the invention. The embodiments described herein are exemplary only, and are not intended to be limiting. Many variations and modifications of the invention disclosed herein are possible and are within the scope of the invention.

Accordingly, the scope of protection is not limited by the description set out above, and each and every claim below, and its equivalents, are incorporated into the specification as an embodiment of the present invention. Thus, the claims are a further description and are an addition to the preferred embodiments of the present invention.

What is claimed is:

1. A digital sports table or sports scorer's table comprising:
   a digital display monitor or screen positioned at the front of the table behind a clear protective and break or shatter resistant primary panel for displaying a game clock and/or a virtual scoreboard in real time;
   one or more secondary panels having static information thereon comprising advertising and/or game or player information;
   a tablet computer, cell phone or other source of display digital content information;
   one or more HDMI cables for digital transfer of display digital content information to the digital display monitor or screen;
   an amplified digital splitter for associating the table with one or more like tables configured to display the same or different images and videos;
   a plurality of lockable wheels for supporting and moving the table;
   safety padding on at least one or more edges of the table; and
   removable side pads.

2. The table of claim 1 wherein the table is associated with at least one like table and the digital display information is the same on each said like table.

3. The table of claim 1 wherein the table is associated with multiple like tables and the digital display information is different on at least two of the said like tables.

4. The table of claim 1 wherein the digital display monitor or screen further displays advertising and/or sports, game, or player information.

5. The table of claim 1 further comprising a service door.

6. The table of claim 1 wherein at least one secondary panel is adjacent to the primary panel.

7. The table of claim 1 wherein the table has two secondary panels and the primary panel is positioned between the secondary panels.

* * * * *